L. J. NELSON.
BOLT.
APPLICATION FILED NOV. 27, 1908.

966,849.

Patented Aug. 9, 1910.

Witnesses:
John Enders.
Chas. H. Buell.

Inventor:
L. J. Nelson
By L. B. Coupland
Atty.

UNITED STATES PATENT OFFICE.

LOUIS J. NELSON, OF CHICAGO, ILLINOIS.

BOLT.

966,849.  Specification of Letters Patent.  Patented Aug. 9, 1910.

Application filed November 27, 1908. Serial No. 464,754.

*To all whom it may concern:*

Be it known that I, LOUIS J. NELSON, a citizen of the United States, residing at Chicago, in the county of Cook and State of Illinois, have invented certain new and useful Improvements in Bolts, of which the following is a specification.

This invention relates to improvements in a machine bolt, and more especially, the kind of bolts used in securing the knives to the cutter-heads of planing machines.

The cutter-heads revolve at a very high speed and it frequently happens that the bolts, used in securing the knives in place, are fractured and the flying pieces liable to and often do injure the operator and other workmen. The breaking of the bolts also cause much annoyance and loss of time in replacing the same.

The object, therefore, of this invention is to provide a bolt that will successfully withstand the severe strain to which it may be subjected and accidents avoided.

Figure 1:
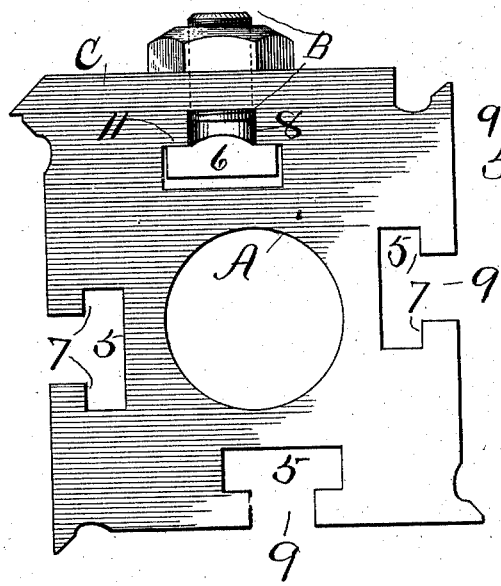
Figure 2:
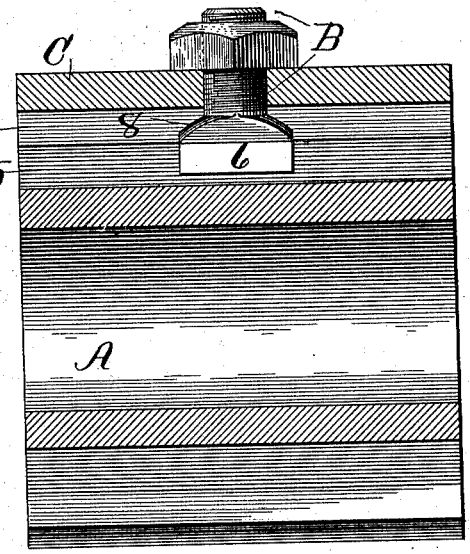
Figure 3:
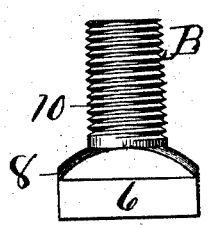
Figure 4:
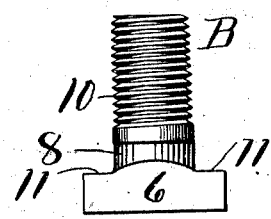

Figure 1 is an end elevation of a cutter-head showing a knife and bolt in their locked position. Fig. 2 is a longitudinal section. Fig. 3 is an elevation of the improved bolt. Fig. 4 is a similar view at right angles thereto.

A represents a cutter-head of the ordinary type; C one of the series of knives, and B the improved bolt for securing the same in place.

The cutter-head is provided with the usual longitudinal grooves 5 into which the clamping bolts are slipped from the ends. These grooves are wide at the bottom corresponding to head 6 of the bolts, and narrowed at the top in forming shoulders 7 which overlap the head 6 and retain the bolt in its clamping position. The bolt in this instance is provided at the junction of the head and shank, with a raised boss or reinforce 8, which comes well up into the narrow part 9 of the grooves 5, as shown in Figs. 1 and 2. This boss is approximately of a width corresponding to the diameter of the shank 10 and extends across the head of the bolt from opposite sides, leaving two flat surfaces 11 of the head to engage the shoulders 7, as best shown in Fig. 1.

The point of fracture of the ordinary bolt is usually at the junction of the head and shank, where the strain is the heaviest. The ordinary bolt can be inserted in any one of four ways so that the line of strain is changed each time that the bolts are taken out, which has the effect of greatly shortening the life of the same.

The improved bolt can only be inserted two ways by reason of the boss 8 swelling up into the narrow part of the grooves 5 and thus lessens the liability of fracture.

Having thus described my invention, what I claim is:—

In a bolt, the combination with a round, threaded shank, of a square head, and a central transverse boss having a curved face extending entirely across the face of the head at the juncture of the shank and head.

In testimony whereof I affix my signature in presence of two witnesses.

LOUIS J. NELSON.

Witnesses:
A. V. SLANWOOD,
G. E. CHURCH.